United States Patent [19]

South et al.

[11] B 3,999,115

[45] Dec. 21, 1976

[54] DYNAMIC STABILIZER FOR SYNCHRONOUS MACHINES HAVING TORSIONAL OSCILLATIONS AND METHOD

[75] Inventors: William H. South, McKeesport; Lee A. Kilgore, Export, both of Pa.

[73] Assignee: Westinghouse Electric Corporation, Pittsburgh, Pa.

[22] Filed: May 2, 1974

[21] Appl. No.: 466,318

[44] Published under the second Trial Voluntary Protest Program on March 9, 1976 as document No. B 466,318.

[52] U.S. Cl. .................................. 322/25; 322/29; 322/32; 322/58
[51] Int. Cl.² ...................... H02H 7/06; H02P 9/00
[58] Field of Search ........................... 322/29–32, 322/25, 58, 17

[56] References Cited
UNITED STATES PATENTS

| | | | |
|---|---|---|---|
| 2,767,367 | 10/1956 | Black | 322/32 |
| 2,854,617 | 9/1958 | Johnson | 322/20 X |
| 3,119,934 | 1/1964 | Lee | 322/20 X |
| 3,167,702 | 1/1965 | Schonung et al. | 322/19 X |
| 3,474,323 | 10/1969 | Kilgore et al. | 322/25 X |

*Primary Examiner*—J D Miller
*Assistant Examiner*—Robert J. Hickey
*Attorney, Agent, or Firm*—M. J. Moran

[57] ABSTRACT

A dynamic stabilizer which includes a voltage generator connected in series with the output terminals of a synchronous AC generator provides compensation for voltages produced by the main AC synchronous machine which compensation is provided to overcome the effects of torsional oscillation between masses in the main AC generator system. Torsional oscillations may exist between the masses of turbines driving the AC generator, the exciter mass for the AC generator, and the mass of the rotor of the generator. Shaft angular velocity is sensed and provided to a frequency discriminating filter since the speed is proportional to the torsional oscillation and since a reference signal is provided to the frequency discriminating filter, the frequency discriminating filter provides an output signal which is proportional to the reference signal plus and minus the frequency of the torsional oscillation. This signal is provided to the previously named series connected generator where a 180° phase shift is effectuated between the output signal of the frequency discriminating filter and the output power from the AC synchronous generator. Scaling means is provided to conveniently match the peak amplitudes of the last named signals. The effect of the phase shift of the signal from the frequency discriminating filter as it is applied to the series connected generator is to compensate for the effect of the torsional oscillations in the output power signal of the AC synchronous generator thus providing a power signal for use in a load which is generally without modulating torsional oscillation.

24 Claims, 7 Drawing Figures

DYNAMIC STABILIZER FOR SYNCHRONOUS MACHINES HAVING TORSIONAL OSCILLATIONS AND METHOD

BACKGROUND OF THE INVENTION

This invention relates generally to feedback control for turbine driven high powered alternating current synchronous generator systems. This invention relates specifically to generator systems of the above type which are utilized to provide electrical power for loads over relatively long transmission lines where the effect of series connected compensating capacitors may introduce torsional oscillation into the mechanical portion of the power generating system. It has been found that in long line electrical transmission systems of the type where the electrical generators are driven from power sources such as steam turbines, multiple rotating masses may be present on a single shaft. As an example the rotating mass of one or more turbines and the rotating mass of an exciter for an AC generator as well as the rotating mass of the generator rotor may be present. It has also been found that because of the mechanical properties of the various parts of the rotating system, torsional oscillation may be possible between any combination of masses. If these torsional oscillations were to become large and undamped they could cause shaft breakage. It has been found in certain applications that such undamped torsional oscillations may exist because of the electrical properties of the AC synchronous generator electrical system. As an example when long transmission lines are required for the delivery of energy to a grid network or load, the inductive effect of the long transmission lines may require series capacitive compensation. However, the effect of the compensating capacitors being connected in series circuit relationship with the inductance of the long transmission lines tends to cause certain resonant frequencies to exist in the output electrical circuit of the AC generator. These resonant frequencies may be reflected by the magnetic coupling between the stator and rotor of the synchronous generator to the mechanically rotating shaft. If the previously described electrical resonant frequency results in a critical mechanical resonant frequency between any of the masses of the generating system, reinforced undamped oscillation may occur which may be of sufficient magnitude to break the shaft. Apparatus and method for solving this problem have been proposed in U.S. Pat. No. 3,662,251 issued May 9, 1972, to O. J. M. Smith entitled "Method and System for Measuring Acceleration and Velocity". This latter patent is related to the sensing of oscillations rather than providing a method for directly correcting for the effect of the oscillation. A similar measuring method and apparatus is described in U.S. Pat. No. 3,662,252 issued May 9, 1972, to O. J. M. Smith and entitled "Tachometer and Method of Obtaining a Signal Indicative of Alternating Shaft Speed." Other U.S. Pat. Nos. 3,477,014 issued to A. L. Blythe on Nov. 4, 1969, and entitled "Electrical Control Systems With Stabilizing Control Means;" 2,981,882 issued Apr. 25, 1961, to M. Rosenblatt entitled "Stabilizing circuit for Dynamoelectric Machines;" and 3,656,048 issued Apr. 11, 1972 to A. W. Hauf entitled, "Non-Linear Exciter Controller for Power System Damping" propose methods for stabilizing low frequency power oscillation by measuring some parameter of a system and operating on the field excitation of the generator for corrective action. It would be advantageous if a method and apparatus could be found which would sense torsional oscillation and quickly operate on the output power of the synchronous generator to thus providing compensation.

SUMMARY OF THE INVENTION

In accordance with the invention a sensor is provided to sense and measure the speed on a rotating shaft in a generator system of the type previously described and provide a signal related thereto. The speed is a measure of the torsional oscillation, as the variation in shaft rotational speed will reflect torsional oscillation. This signal is provided to a frequency discriminating filter or similar transfer means where it is multiplied by a reference signal which signal is typically of the same frequency as the output electrical power produced by the generator, which may be as a typical example 60 hz or 50 hz. This produces an output signal at the otput of the frequency discriminating filter which is related to the reference frequency plus and minus the torsional oscillation frequency. The latter signal is then provided to a voltage generator which is connected in series opposition to the output of the synchronous generator. The output signal of the voltage generator or compensating means is scaled to provide a maximum amplitude which is generally equal to the maximum amplitude of the output signal from the previously described generator. The signal from the frequency discriminating filter is 180° phase shifted by the compensating means or series opposing generator. Since the output from the power generator is also equal to the reference signal plus and minus the torsional oscillation frequency the latter signal is compensated for by the signal produced in the compensating means or series connected generator. This produces an overall output signal at the output of the series connected compensating generator which has little or no torsional oscillation effect in it. Since this signal has little or no torsional oscillation in it, it will not excite the previously described inductive and capacitive elements of the long lines which interconnect the generator and the load. Consequently, the resonant characteristics of the inductive and capacitive elements will have little effect and therefore no electrical resonant build-up will be available for reflection back into the mechanical portion of the generator system where it may cause damage to the shaft of that system because of the previously described trend towards torsional oscillation at certain mechanical frequencies. In other embodiments of the invention the shaft rotational speed is sensed by sensing the current and voltage of the generator rather than mechanical speed of the shaft. In still other embodiments of the invention a cyclo-converter of the type generally known in the art is utilized as a portion of the previously described compensating means in conjunction with the transfer means or frequency discriminating filter to thereby provide the compensation desired. In another embodiment of the invention a tuned filter which may be tuned at a resonant electrical frequency which is likely to cause torsional oscillation in the mechanical system is provided at the generator output for utilization with a cyclo-converter for preventing the undesired resonant frequency effects previously described from occurring. In still another embodiment of the invention, a cyclo-converter is utilized in conjunction with the field windings of a compensating generator which is connected in compensating orientation with the main power generator as previously described. The field is controlled in such a way as to provide output power which has no oscillating torsional component to the load. In still another embodiment of the invention, the compensating means may be a transformer and a silicon control rectifier connected in relationship with the output of the synchronous generator to utilize current compensation to compensate for the effects of the torsional oscillation.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENTS

Figure 1:
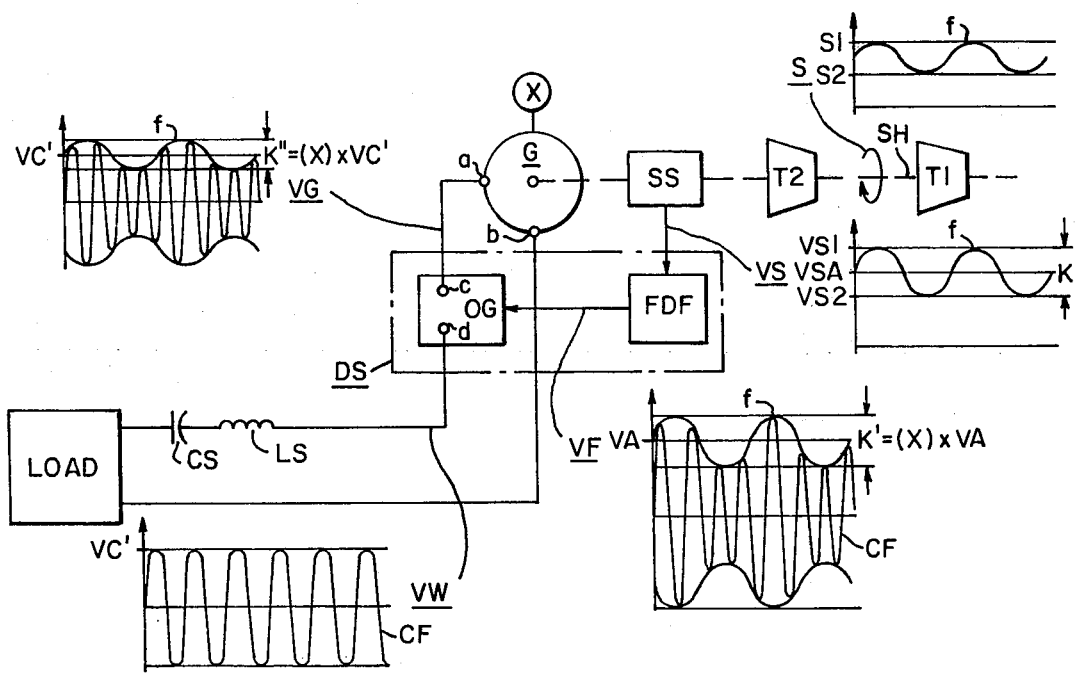
FIG. 1 shows a block diagram of a synchronous generator system including the mechanical and electrical portion thereof, with a dynamic stabilizer.

Referring now to the drawings and FIG. 1 in particular, a block diagram on an electrical generating system including electrical transmission lines, load and dynamimc stabilizer is shown. With regard to the elements of FIG. 1 certain things have been discovered. It has been found that there is a possibility for multiple inertias to exist on a single shaft of a turbine generator system because of the mechanical properties of the rotating masses and the shaft which interconnects them. Typical rotating masses may comprise the rotating parts of turbines, the rotor of an exciter for an electrical generator and rotor of the generator. The masses are not limited to these kinds and types. The turbines may be of the low pressure type and/or the high pressure type and may be of the steam, gas and/or water type or any other suitable type. Natural mechanical resonant frequencies may exist among any and all of these masses. The total number of natural frequencies available is approximately equal to the total number of mass-spring sets, where a mass-spring set is defined as any two masses interconnected by a shaft. Some common natural frequencies for steam turbine generator systems have been found to be 15 hz, 23 hz, and 28 hz. It has been found that if electrical load power for the generator varies or oscillates, it may be induced back into the mechanical portion of the system where the resonant frequencies of the mechanical portion of the system may lead to shaft breakage. It has been found that the amplification factor Q at the resonant frequencies of the mechanical system may be very high. It is not unusual to find a Q of 300 for the mechanical system. It has been found that the series capacitors previously described utilized in conjunction with line inductances for long line transmissions systems can cause oscillations or can resonate at certain resonant electrical frequencies which are a function of the capacitance and inductance of the lines. The series capacitors are necessary for phase angle correction because of the inductance of the long line. It has been found that the mechanical torque produced by the electrical resonant frequency will itself have a frequency of 60 hz plus and minus the electrical resonant frequency. Consequently, if the electrical resonant frequency is 45 hz then the mechanical torque frequency related thereto are 15 hz and 75 hz. It has been found that in almost all cases the lower electrical resonant frequency may be the same as a critical mechanical resonant frequency of the turbine generator system. It has also been found that the electrical resonant frequency is almost always lower than 60 hz because of the necessary choice of capacitors for phase angle correction. It is not always to be presumed that 60 hz is the frequency of the power generating system, 50 hz may be the frequency in some cases and 25 hz in other cases and of course none of these are limiting. However, for purposes of illustration and because of the predominance of 60 hz generating power it can be said that mechanical frequencies of 15 hz, 23 hz, and 28 hz which correspond to electrical frequencies of 45 hz, 37 hz, and 32 hz are common frequencies to be avoided in steam turbine generator systems because of the potential damage that may occur if the shafts are caused to oscillate at any or all of the previously described mechanical frequencies. There is shown in FIG. 1, for the purposes of illustration, where a two-turbine electrical generating system comprising, in addition to the turbines, a generator G and an exciter X are shown. The turbines are generally designated T1 and T2. The shaft SH is designated as rotating at a rotational speed or angular velocity S which may be measured in RPM. A plot of shaft speed S between amplitude limits S1 and S2 for a torsional oscillation is shown. The frequency of oscillation is generally designated $f$. An appropriate speed sensor SS which may be a shaft connected tachometer senses the variation in speed and provides, in one embodiment of the invention, an output voltage signal generally designated VS which oscillates at the previously described frequency $f$ between limits VS1 and VS2 with an average value of VSA. This signal is provided to a dynamic stabilizer generally designated DS. The dynamic stabilizer comprises in one embodiment a frequency discriminating filter or transfer means FDF which has a reference signal generating means therein which provides a reference signal which may be 60 hz. This signal is electrically or mechanically multiplied by the frequency $f$ of the voltage signal VS at the output of the speed sensor SS. The output signal VF of the frequency discriminating filter appears to be a modulated sine wave where the carrier thereof has the same frequency as the reference signal previously described and where the modulation signal is of generally the same frequency $f$ as the previously described voltage signal VS. The carrier is generally designated CF in this case. The amplitude of the modulating signal is generally designated K' and the average height of the modulating signal is generally designated VA. The previously described signal VF, which is related to the carrier frequency CF plus and minus the torsional oscillation frequency $f$ is provided to a compensating means or series connected generator OG. The output terminals of the synchronous machine or generator G are generally designated $a$ and $b$. In this embodiment of the invention a one-phase output is shown and the line connected to terminal *b* is shown to be a system common line or lead. The *c* terminal of the series opposing generator OG is connected to the terminal *a* of the generator G. The other terminal *d* of the compensating means or series opposing generator OG is connected to a LOAD through representative inductance LS and capacitance CS, where the inductance LS is generally known as line inductance and where the capacitance CS is generally known a line capacitance and is generally from compensating capacitors. The output signal between the terminals *a* and *b* of the generator is generally designated VG and may appear to be a reference frequency signal modulated by the torsional oscillation frequency or said in another way may appear to be similar to the previously described voltage signal VF which is provided at the output of the frequency discriminating filter FDF. The modulated portion of the output signal of the generator G has an amplitude K'' which is equal to some constant X times VC' where VC' is the average values of the modulating signal at the output of the generator G. The net effect of connecting the series opposition generator OG with the main power generator G is to provide a power signal VW for utilization in the LOAD. The signal VW has the carrier frequency CF and has a constant amplitude VC'. Consequently, it can be seen that the effect of shifting the output signal from the frequency discriminating filter FDF by 180° with respect to the output signal VG from the generator G and adding the latter signals together is to generally eliminate the modulating portion of the output power signal from the generator G. It will be noted with respect to the output signal VF from the frequency discriminating filter FDF that the amplitude of the modulating signal K' is equal to X times VA.

Figure 2:
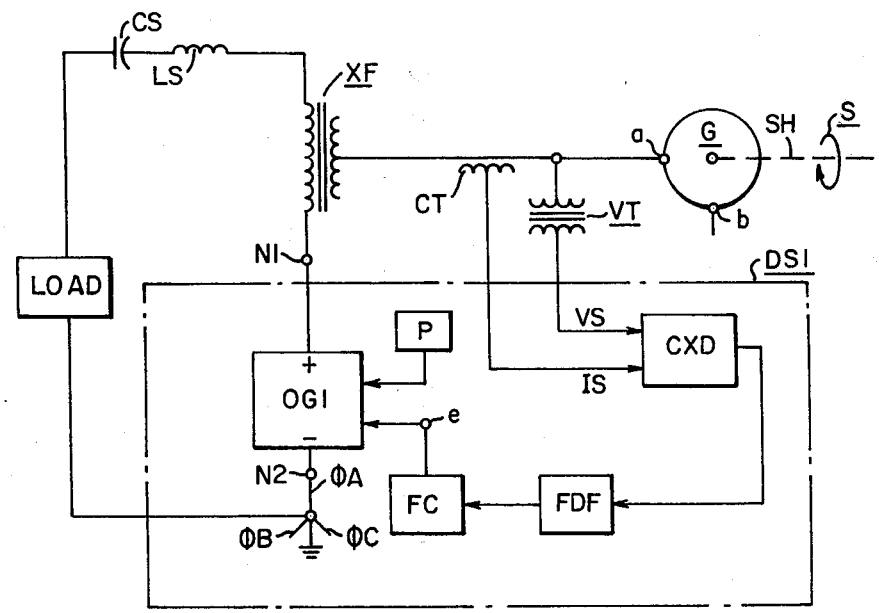
FIG. 2 shows an embodiment of the invention utilizing a potential transformer and voltage transformer for sensing shaft rotational speed.

Referring now to FIG. 2 another embodiment of the invention is shown. In this embodiment of the invention a shaft SH is shown revolving at a speed S. The output terminals of the generator G are generally designated *a* and *b*. There is shown connected to the output of the generator a power transformer generally designated XF for the purposes of providing high voltage to the transmission line. The LOAD is generally shown connected in circuit relationship with the secondary of the transformer XF and the previously described capacitive element CS and inductive element LS. The compensating means or series opposing generator OG1 is shown connected to the bottom terminal to the secondary of the transformer XF at N1. The LOAD is connected in series circuit relationship with the previously described compensating means OG1 at N2. It is to be understood with respect to the embodiments of FIGS. 1 and 2 that only one phase $\phi A$ is shown. The interconnection of phases $\phi B$ and $\phi C$ at a grounded point or neutral is also shown but the electrical elements are deleted for purposes of illustration and clarity. A separate power source P is provided to the compensating means or generating means OG1. A current transformer generally designated CT is shown connected diagrammatically to the primary side of the transformer XF between the transformer XF and the output terminal *a*. In addition, a voltage transformer VT is also shown. It has been found that the voltage which is produced at the secondary winding of the previously described voltage transformer VT is proportional in wave shape to the torsional oscillation introduced in the shaft SH as it revolves at a speed S which speed may vary according to the torsional oscillation. This latter voltage is generally designated VS and is shown existing at the secondary of the previously described voltage transformer VT. It has also been found that the generator current is useful to ascertain the voltage dropped across the internal known reactance of the generator G. Since it is desired to correct for the internal reactance of the generator the component of apparent torsional oscillation which may appear as part of the voltage signal VS must be compensated for by the current signal IS at the secondary winding of the current transformer CT. The latter two mentioned signals namely VS and IS are provided to a compensating transducer CXD. Here the effect of the internal reactance of the generator is removed from the voltage signal VS by utilizing the current signal IS and the known reactance of the generator G. Consequently the output signal of the compensating transducer is generally of the same wave shape as the signal designated VS in FIG. 1. This signal is provided to a frequency discriminating filter FDF similar to the one shown in FIG. 1. The output from this filter FDF is similar in wave shape to the output from the filter FDF of FIG. 1, which output signal is generally designated VF in FIG. 1. This output signal may then be provided to a firing control circuit FC where the signal may be utilized to provide firing signals for certain elements which will be described later which may be present within the compensating means or series opposed generator circuit OG1. In another embodiment of the invention the output from the frequency discriminating filter FDF bypasses the firing circuit and is provided directly to a point *e* from whence it is provided to the previously described compensating means. The firing circuit FC is utilized in cases where solid state circuitry is present within the compensating means or generator means OG1. It will be noted that a separate source of power P may be provided to the compensating means OG1 to be utilized thereby for compensating purposes. The compensating transducer CXD, the frequency discriminating filter FDF, the firing control circuit FC (when utilized), the compensating means OG1 and the power source P may provide the critical elements for the dynamic stabilizer DS1.

Figure 2A:
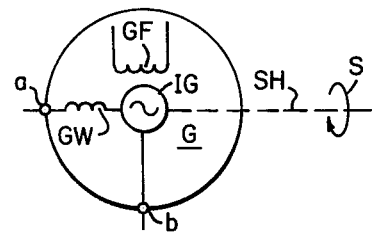
FIG. 2A shows a schematic electrical diagram of the generator G of FIG. 2.

Referring to FIG. 2a, a schematic diagram of the generator G is shown including an ideal generator IG and an internal reactance generally designated GW. The output terminals *a* and *b* are shown as well as the generator field winding GF. The shaft SH of the generator is shown revolving at a speed S. The torsional oscillation which is related to the variation in speed of the mechanical shaft is reflected most accurately in the output of the ideal generator. However, this signal is hidden or masked by the effect of the internal reactance GW. It is for this reason that the previously described current transformer CT and voltage transformer VT shown in FIG. 2 are utilized.

Referring once again to FIG. 2 it can be seen that the voltage signal VS and current signal IS are utilized by the compensating transducer to provide a signal to the frequency discriminating filter FDF. This latter signal is related to the torsional oscillation which may exist in the shaft SH. This signal is provided to the previously described compensating means OG1 where it is utilized in conjunction with the power source P to provide compensation for the output power, of the secondary of the transformer XF. Typical values for a generating system has been found to be 20 kilovolts and 25 kiloamp on the output of the generator and 500 kilovolts and 1 kiloamp on the secondary of the transformer XF. For this reason the compensating means is connected in the secondary circuit of the transformer XF. Generally, it has been found that if the compensating means OG1 can produce 8000 volts of compensating signal in series with the 500 kilovolts across the secondary winding of the transformer XF that is sufficient for compensating purposes. One way to view the compensating effect of the dynamic stabilizer is to think of the compensating means OG1 as providing a signal which fills in the valleys and reduces the peaks of the modulated output power signal from an electrical generating system which has torsional oscillation taking place in mechanical portions thereof. It will be noted with respect to the compensating means OG1 that its terminals are designated N1 at the positive terminal and N2 and the negative terminal. The designation of polarity is for illustrative purposes it being understood that the polarities made be reversed depending upon the polarities of the secondary of the transformer XF.

Figure 3:
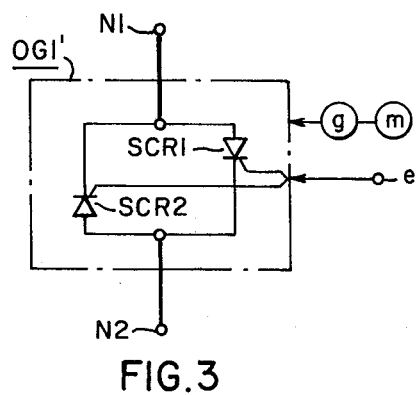
FIG. 3 shows a block diagram of a cyclo-converter as it is utilized as an embodiment of the invention.

Referring now to FIG. 3 there is shown a compensating means generally designated OG1' which may be utilized to replace the compensating means OG1 shown in FIG. 2. The device OG1' may be connected into the circuit of FIG. 2 in such a manner that terminals N1 and N2 of the device OG1' correspond to the terminals N1 and N2 of the device OG1 of FIG. 2. The device OG1' may be known as a cyclo-converter. This electrical device is well known in the art and may be utilized to generate voltage and current of any frequency phase and amplitude desired within limits. A block diagram of the device comprises, diagrammatically, two silicon controlled rectifiers SCR1 and SCR2 connected in opposite polarity parallel circuit relationship. The gates of the two previously described silicon controlled rectifiers are conveniently connected to the input line e. The power source for the cyclo-converter OG1' may be represented by a motor generator set where the motor is designated m and the generator is designated g. This motor generator set may provide an alternating current of a fixed frequency, amplitude and phase. In accordance with the invention the cyclo-converter can convert the amplitude, frequency and phase, of the generator g to other values within limits. The cyclo-converter OG1' may be connected in FIG. 2 as previously described. In the embodiment of the invention employing the cyclo-converter of FIG. 3, the firing circuit FC of FIG. 2 is a necessary element for controlling the gating action of the silicon controlled rectifiers SCR1 and SCR2. It is to be understood with respect to the cyclo-converter OG1', that the phase, amplitude and frequency of the output of the cyclo-converter OG1' is controlled by the silicon controlled rectifiers and other control elements not shown in the cyclo-converter block diagram OG1' to thereby provide a series opposition voltage at terminals N1 and N2 which generally compensate for the voltage induced across the secondary of the transformer XF of FIG. 2. It is to be understood with respect to the cyclo-converter OG1' of FIG. 3 that the motor generator set m-g replaces the power supply P shown in FIG. 2.

Figure 4:
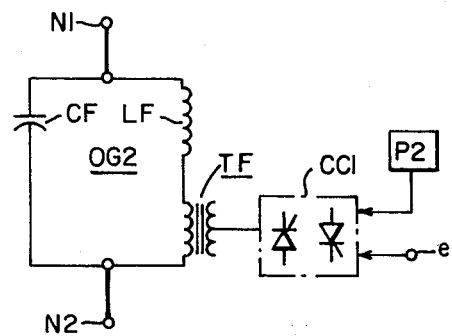
FIG. 4 shows a tuned filter as it is utilized as an embodiment of the invention.

Referring now to FIG. 4 another embodiment of the invention is shown in which a tuned filter network may replace the compensating means OG1 of FIG. 2. The compensating means of FIG. 4 which is generally designated OG2 is a passive rather than active means. It is to be understood that the cyclo-converter OG1 of FIG. 3 is an active device. The compensating means OG2 of FIG. 4 comprises a tuned filter network connected in series with terminals N1 and N2 so that the tuned filter network OG2 may be conveniently inserted in the circuit of FIG. 2 at terminals corresponding to the terminals N1 and N2 of FIG. 2. In this case the filter is tuned to a critical frequency, as an example 60 hz minus the torsional oscillation frequency, because of the value of the capacitor CF and the inductor LF utilized in conjunction with the primary of the transformer XF. The output signal of the generator G shown in FIG. 2 as developed across the secondary winding of the transformer XF shown in FIG. 2 may be passed through the filter from N1 to N2. However the previously described component of power which represents the frequency 60 hz minus the torsional oscillation frequency is trapped by the filter and passed to the cyclo-converter CC1 by way of the transformer TF. Consequently the filter may be thought of as a band reject filter for the critical frequency (60 hz minus the torsional oscillation frequency). The cyclo-converter CC1 may then compensate for the critical frequency in a manner previously described with respect to FIG. 3. In particular the power from the power source P2 is utilized by the cyclo-converter CC1 in conjunction with firing or intelligence information at the terminal e to damp out or cancel the previously described critical frequency. It will be noted that the signal which passes through the filter from the terminal N1 to the terminal N2 may retain a component of the torsional oscillation namely 60 hz plus the torsional oscillation frequency. In general the higher critical frequency in every case where a carrier is modulated by a torsional oscillation frequency has not been found to be as detrimental to the mechanical properties of the generating system as the lower frequency. This is because the masses of the generator system tend to be of a value which more easily resonate at the lower frequency than at the higher frequency. It will be noted with respect to the embodiment of FIG. 4 that the cyclo-converter CC1 need not accommodate full load power but need only be of a sufficient power rating to compensate for the critical component of torsional oscillation.

Figure 5:
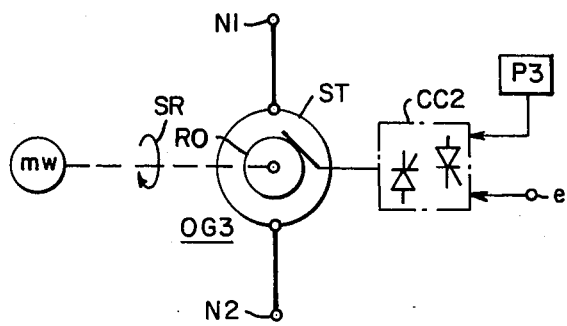
FIG. 5 shows a field controlled compensating generator as it is used as an embodiment of the invention.

Referring now to FIG. 5 still another embodiment of the invention is shown. This embodiment is generally designated OG3 and comprises a synchronous generator having a rotating field and fixed stator. The rotating field is generally designated RO and the stator is generally designated ST. The rotor RO is caused to spin at a fixed speed, generally designated SR. The rotor RO is driven by a suitable rotary motion producing device mw. The field of the rotor is electrically connected to the output of a cyclo-converter CC2. The cyclo-converter has a suitable source of power generally designated P3 and a suitable source of information or firing intelligence generally designated e. The compensating means OG3 may be described as a wound rotor machine. This is also an active device similar to the device of FIG. 3. The wound rotor machine is driven at a speed that is close to one of the oscillating frequencies. The rotor RO of the machine may be wound for two phase power and connected to a dual cyclo-converter. The cyclo-converter is controlled from the signal at e such that the magnetic field of the two phase rotor rotates slowly to add to or subtract from the basic mechanical rotation of the machine OG3. This causes the generator voltage of the machine OG3 at the stator to be of the proper phase and frequency with respect to the torsional oscillation of generator G to cause compensation of the amplitude of the power from the generator G. Since most of the energy for damping the output power of the transformer secondary FX as shown in FIG. 2 comes from the spinning shaft of the wound rotor machine OG3 the power rating of the dual solid state cyclo-converter may be small. Since power flows to and from the wound rotor RO the prime mover mw need only be large enough to supply losses.

Figure 6:
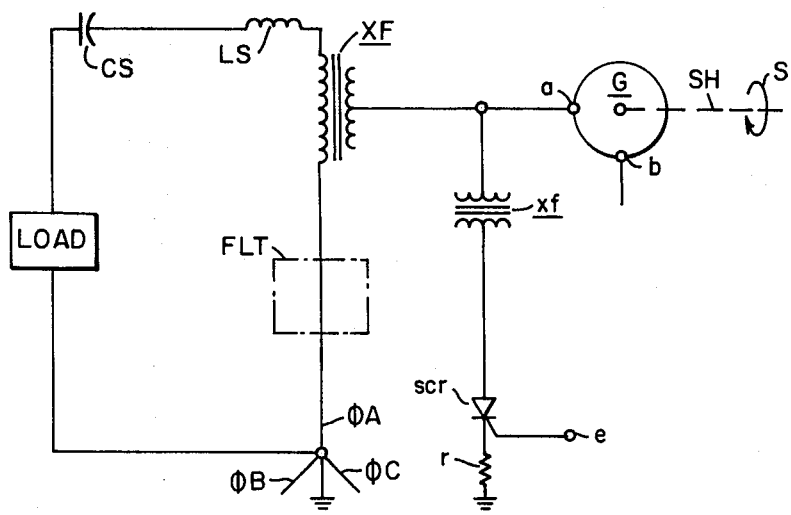
FIG. 6 shows a parallel connected current controlled device as it is utilized as an embodiment of the invention.

Referring now to FIG. 6 a power damping network is shown connected in shunt circuit relationship with the output of generator G. It is to be understood that the generator G is connected to various rotational masses by way of the shaft SH which is rotating at a speed S which speed may vary according to the torsional oscillation. The output power at the terminal $a$ of the synchronous machine G is connected to the primary winding of a transformer generally designated XF, the secondary of which is connected in series circuit relationship with a load. The previously described inductive and capacitive elements LS and CS respectively are present. Only the phase $\phi A$ is shown generally completely with only the interconnection terminal for the phases $\phi B$ and $\phi C$ being shown. In this case a transformer xf is connected to the line between the main power transformer XF and the output terminal $a$ of the generator G. A silicon control rectifier bridge scr (only part of which is shown) is connected in series circuit relationship with the secondary of the previously described transformer $xf$. A load resistor $r$ is connected across the output terminals of the bridge. A suitable firing terminal $e$ such as is shown in FIG. 2 is also shown connected to the gate of the silicon control rectifier scr. The terminal $b$ of the generator is shown as being non-connected although it is to be understood it is part of the power circuit for the output of the generator G. The power variations of the machine G are sensed by a power transducer such as shown in FIG. 2 and the gating of the thyristor bridge scr is controlled by a signal proportional to the rate of change of power. The phase of the power signal is chosen such that the power is absorbed in the damping resistor $r$ when the rotor of the machine G is accelerating due to an upswing in the torsional oscillation. The net effect is that if the machine starts to oscillate due to resonance with the electrical system, the damping resistance $r$ will draw off any power which is out of phase with the oscillating power. This shields the machine from the damaging oscillation and helps damp out any oscillations. Since the damping resistor $r$ is connected in parallel with the power system which contains the LOAD as well as the machine G, the power that the resistor $r$ draws divides between the two paths. It is only the component of power that flows from the machine G that produces damping. The damping network must be large enough to allow for some lost damping power to the power system which contains the load, otherwise a filter generally designated FLT may be placed between the damping resistor $r$ and the power system or load path to block the frequencies produced by the damper $r$. It is also known that the resistive load $r$ can only absorb power in one direction. In order to have power flow in the shunt damper $r$ without large harmonics, the simple resistive load $r$ can be replaced by a device that can absorb and redeliver power such as a DC machine with large inertia (not shown). If the resistive load $r$ is used, the average power level to the resistor $r$ can be biased as the level of the oscillating component increases in order to keep the power flow continuous and to minimize harmonics.

It is to be understood with respect to the various embodiments of this invention that the embodiments shown in FIGS. 4 and 5, as an example, need not be exclusive. As an example the compensating means OG2 of FIG. 4 and OG3 of FIG. 5 may be connected in series circuit relationship with other similar compensating means to remove other critical frequencies should the need arise. It is also to be understood that in some embodiments of the invention the compensating means may be interconnected. As an example, the compensating means in FIG. 4 may be connected in series circuit relationship with the compensating means of FIG. 5. It is also to be understood that the embodiments of FIGS. 3, 4 and 5 are not limited to the control system shown in FIG. 2. Consequently the embodiments in FIGS. 3, 4 and 5 may be utilized with the control system shown in FIG. 1 or with any other convenient control system. It is also to be understood that the diagrammatic view of the cyclo-converter shown in FIGS. 3, 4 and 5 for example are not completely illustrative of all the electrical and electronic components of a cyclo-converter but are merely diagrammatic in nature, it being understood that the elements of a cyclo-converter are well known in the art. It is also to be understood with respect to the various embodiments of the invention that the various rotating masses described need not be limited to turbine parts, exciter parts or generator parts exclusively but that any rotating mass which may cause torsional oscillation in the output signal of a generator may be compensated for in the manner previously described. It is to be understood with respect to the embodiments of this invention that the load may be an electrical network including capacitive, inductive and resistive elements and switches and circuit breakers and any other elements which may be found in an electrical network or similar arrangement. It is to be understood that the various power ranges previously described with respect to the embodiments of the invention are not limiting. With respect to the embodiments of this invention it has been found that the size of the power handling equipment for compensating for torsional oscillations need only be a small fraction of the actual power requirement of the machine. If the generator is not forceably driven at a critical frequency, the damping power requirement for eliminating that frequency is very small. Under certain conditions the mechanical system may "ring" and the damping power must be large enough to overcome any negative damping in the system and have enough power capability remaining to effect a decay in system oscillation in a reasonable time. It has been found that a power damper having a power capability of approximately 1 to 2% of the machine power rating will suffice, although these figures should not be considered as limiting. It is also to be understood that many mechanical resonant frequencies may exist and that any or all of them may be compensated for as desired by using the various embodiments. It is to be understood with respect to the embodiments of this invention that the problems discussed herein are generally caused by generator and transmission systems which have one or more electrical oscillating frequencies, where a transient electrical oscillation or noise bump may produce a torquing of the mechanical portion of the generator at frequencies such as 60 cycles plus and minus the oscillation frequency. If this oscillating generator torque happens to be at one of the torsional mechanical resonant frequencies of the rotating masses of the generating unit G an appreciable oscillation of the generator may result which feeds a voltage into the electrical system which will have a component of the same frequency and phase as the oscillating current which feeds it and so will feed energy back again into the mechanical system thus producing enhance torsional oscillation. If the magnitude of this effect is not dampened, sustained oscillations may build up to damaging amplitudes.

The apparatus and methods embodying the teachings of this invention have many advantages. One of the advantages lies in the fact that the output power is directly controlled by a suitable control system or damping means so that the effects of electrical resonance in the electrical circuit and mechanical resonance in the rotating shaft are isolated from each other directly. Another advantage lies in the fact that the field of the machine G need not be controlled because the power can be controlled directly. Another advantage lies in the speed of control.

What we claim as our invention:

1. A dynamic stabilizer for compensating for the effect on output electrical power of torsional oscillation in a resilient shaft between masses of an electrical power generating system which is capable of generating electrical power at a nominal frequency, comprising:
   a. torsional oscillation sensing means for sensing said torsional oscillation, said torsional oscillation sensing means having an output, said torsional oscillation sensing means providing a torsional oscillation output signal at said latter output which latter signal is related to said torsional oscillation;
   b. transfer means for operating on said torsional oscillation output signal, said transfer means having an input and an output, said transfer means input being connected to said torsional oscillation sensing means output to receive said torsional oscillation output signal, said transfer means operating on said torsional oscillation output signal in such a manner as to provide a resulting transfer means output signal at said transfer means output which is characterized as being related to said nominal frequency of said electrical power and said torsional oscillation; and
   c. compensating means for directly compensating for the effect of said torsional oscillation on said generating system output electrical power, said compensating means having a first input which is connected to an electrical power output terminal of said power generating system where said output electrical power is available, said compensating means having a second input which is connected to said output of said transfer means, said compensating means having an output which is connectable with a load, said compensating means receiving said output electrical power from said generating system at said first input which power is affected by said torsional oscillation, said compensating means receiving said transfer means output signal, said later signal being utilized by said compensating means to operate directly on said output electrical power to thereby make available to said load electrical power which is generally unaffected by said torsional oscillation even though said torsional oscillation is present in said shaft.

2. The combination as claimed in claim 1 wherein said output of said sensing means is electrical terminal means, said output and said input of said transfer means are electrical terminal means, and said compensating means second input is electrical terminal means.

3. The combination as claimed in claim 1 wherein said torsional oscillation sensing means comprises shaft velocity sensing means.

4. The combination as claimed in claim 2 wherein said torsional oscillation sensing means comprises velocity sensing means for measuring the velocity of said resilient shaft, said torsional oscillation sensing means output signal comprising an electrical signal which is related to the variation in said velocity of said shaft.

5. The combination as claimed in claim 4 wherein said velocity of said shaft varies at a fixed frequency for a period of time, said electrical output signal of said velocity sensing means varies in proportional to said shaft velocity.

6. The combination as claimed in claim 5 wherein said velocity sensing means comprises tachometer means, said shaft velocity changing generally sinusoidally, said tachometer torsional oscillation output electrical signal being generally of the same sinusoidal frequency as said shaft, said amplitude of said tachometer output signal being proportional to the amplitude of said torsional oscillation.

7. The combination as claimed in claim 1 wherein said transfer means operates on said torsional oscillation sensing means output signal by providing a reference signal which is related to said nominal frequency of said electrical power, said reference signal being multiplied by said torsional oscillation output signal to thus provide said transfer means output signal in the form of said reference signal modulated by said torsional oscillation sensing means output signal.

8. The combination as claimed in claim 6 wherein said transfer means operates on said tachometer means output signal by utilizing a reference electrical signal which is related to said nominal frequency of said electrical power which reference signal is multiplied by said tachometer means output signal to thus provide said transfer means output signal in the form of said reference signal modulated by said tachometer output signal.

9. The combination as claimed in claim 8 wherein said nominal frequency of said electrical power and thus said frequency of said related electrical reference signal is 60 hz.

10. The combination as claimed in claim 8 wherein said nominal frequency of said electrical power and thus said frequency of said related electrical reference signal is 50 hz.

11. The combination as claimed in claim 1 wherein said compensating means operates on said output electrical power by utilizing said transfer means output signal torsional oscillation and cancelling the torsional oscillation in said output electrical power.

12. The combination as claimed in claim 8 wherein said compensating means comprises a power generator means.

13. The combination as claimed in claim 8 wherein said transfer means output signal is different in phase by 180° from said shaft velocity signal and is added to said output electrical power in said compensating means to thereby cancel the effect of torsional oscillation in said output electrical power.

14. The combination as claimed in claim 1 wherein said torsional oscillation in said shaft generally causes voltage oscillation in said output electrical power output, said electrical power being generally of the alternating type, said compensating means operating on said output electrical power to thereby make of generally peak amplitude available to said load by operating on the voltage component of said power.

15. The combination as claimed in claim 1 wherein said torsional oscillation in said shaft generally causes electrical current oscillation in said output electrical power, said electrical power being generally of the alternating type, said compensating means operating on said output electrical power to thereby make electrical power of generally fixed peak amplitude available to said load by operating on the current component of said power.

16. The combination as claimed in claim 12 wherein the component of voltage of said output electrical power related to said torsional oscillation is cancelled.

17. The combination as claimed in claim 12 wherein the component of current of said output electrical power related to said torsional oscillation is cancelled.

18. An electrical power generating system, comprising:
  an alternating current electrical generator which is capable of generating electrical power of generally nominal fixed frequency and generally nominal fixed voltage amplitude at output terminals thereof and supplying said power to a load, said generator having a rotor of predetermined mass;
  energy supply means for driving said rotor to thereby generate said power, said energy supply means having a rotatable portion of predetermined mass;
  resilient shaft means interconnecting said rotor and said energy supply means rotatable portion, the rotational velocity of said shaft means being capable of changing periodically in relation to torsional oscillation in said resilient shaft means thus causing said nominal fixed amplitude of said electrical voltage to be in fact modulated in relation to said periodic change of said shaft velocity;
  tachometer means disposed adjacent said shaft means to measure said rotational velocity of said shaft means and provide an electrical output signal at an output terminal thereof which signal is proportional to said rotational velocity;
  frequency discriminating filter means having an input terminal and an output terminal, said input terminal being connected to said output terminal of said tachometer means, said tachometer means output signal being multiplied within said frequency discriminating filter by a reference signal having the same nominal frequency as said electrical power to thereby provide a signal at the output terminal of said frequency discriminating filter which has a resulting wave shape related to said frequency of said reference signal plus said frequency of said tachometer means output signal, said resulting wave shape also being related to said frequency of said reference signal minus said frequency of said tachometer means output signal; and
  voltage compensating means interconnected between one terminal of said alternating current electrical generator and said load, said voltage compensating means having an input terminal connected to said output terminal of said frequency discriminating filter means, said output signal of said frequency discriminating filter means being utilized by said voltage compensating means to compensate for said modulation of said electrical power by said torsional oscillation to thereby generally provide electrical power of said nominal fixed frequency and said nominal fixed voltage amplitude to said load.

19. The combination as claimed in claim 18 wherein said voltage compensating means comprises a separate source of power the voltage amplitude and frequency of which are controlled by said output signal from said frequency discriminating filter means, the resulting modulated compensating voltage signal having a carrier frequency which is thus generally the same as the carrier frequency of said modulated output electrical power but the modulation envelope of which is generally 180 degrees out of phase from the modulation envelope of said output electrical power to thus cancel said effect of said torsional oscillation.

20. The combination as claimed in claim 19 wherein said voltage compensating means comprises a cyclo-converter which controls a separate source of compensating power, said cyclo-converter having a control terminal electrically controlled by said frequency discriminating filter means output signal to thereby provide a modulated compensating voltage signal the carrier frequency of which is the same as the carrier of said modulated electrical output power but the modulation envelope of which is 180 degrees out of phase from the modulation envelope of said output electrical power to thus cancel said effect of said torsional oscillation.

21. The combination as claimed in claim 18 wherein said voltage compensating means comprises a power filter connected in circuit relationship with said load and with said terminal of said power generating system, said power filter being tuned to the carrier frequency of said power minus at least one frequency component of said torsional oscillation frequency, a cyclo-converter means, said power filter being magnetically interconnected by transformer means to said cyclo-converter means, said cyclo-converter means controlling a separate source of compensating power, said cyclo-converter means having a control terminal electrically controlled by said frequency discriminating filter means output signal to thereby enhance operation of said power filter by generally cancelling that component of output power characterized by said carrier frequency of said output power minus said frequency component of said torsional oscillation.

22. A method for compensating for the effect of torsional oscillation between rotating masses in an electrical generating system which is capable of providing electrical power to a load, comprising the steps of:
  sensing said torsional oscillation and providing a signal related thereto;
  multiplying said last signal in a transfer means by a reference frequency signal which is generally related to the output frequency desired of said power generating system and providing an output signal related to said reference signal plus and minus said torsional oscillation signal; and
  utilizing said last named output signal in a compensating means connected in circuit relationship with the output terminal of said generator means to compensate for the effect of torsional oscillation in the output power of said generating means by utilizing the last named signal from said transfer means to compensate for the effect of said oscillation in said power signal.

23. A dynamic stabilizer for compensating for an effect of the change in relative motion between the rotor and stator of an electrical power generating system which generates electrical power of a generally given frequency, comprising:

a. sensing means for sensing said change in relative motion, said sensing means having an output, said sensing means providing an output signal at said output which is related to said change in relative motion;
b. transfer means for operating on said output signal from said sensing means, said transfer means having an input and an output, said transfer means input being interconnected to said sensing means output to receive said output signal, said transfer means operating on said output signal from said sensing means to provide a transfer means output signal at said transfer means output which is related both to said frequency of said electrical power from said power generating system and said change in relative motion between said rotor and said stator; and
c. compensating means for compensating for said effect of said change in relative motion, said compensating means having a first input which is connected to an electrical power output terminal of said power generating system, said compensating means having an output which is interconnectable with a load, said compensating means receiving electrical power from said generating system at said first input which power is affected by said change in relative motion, said compensating means receiving said output signal from said transfer means at a second input of said compensating means, said later signal being utilized by said compensating means to operate on said electrical power from said generating system to thereby tend to resist the effect upon said electrical power of said change in relative motion between said rotor and said stator.

24. The combination as claimed in claim 23 wherein said change in relative motion between said rotor and stator is periodic and of a given frequency, said sensing means sensing said later frequency, said transfer means output signal being related to the difference between said later frequency and said frequency of the electrical power from said power generating system.

* * * * *